United States Patent [19]

Kopp et al.

[11] 4,246,315

[45] Jan. 20, 1981

[54] CARRIER MATERIALS IMPREGNATED WITH THERMOSETTING RESINS, PROCESS FOR THEIR MANUFACTURE AND THEIR USE

[75] Inventors: Otto Kopp; Helmut Holzer; Charlotte Birnbaum geb. Schinko, all of Neu-Ulm, Fed. Rep. of Germany

[73] Assignee: Sud-West Chemie GmbH, Fed. Rep. of Germany

[21] Appl. No.: 2,963

[22] Filed: Jan. 12, 1979

[30] Foreign Application Priority Data

Jan. 13, 1978 [DE] Fed. Rep. of Germany ....... 2801396

[51] Int. Cl.³ ................. B05D 3/06; B05D 3/02; B32B 35/00; B32B 31/28
[52] U.S. Cl. .................................. 428/315; 204/16; 204/158 HE; 204/159.15; 427/35; 427/41; 427/44; 427/54.1; 427/55; 427/140; 427/148; 428/345; 428/349; 428/531; 428/913; 428/914
[58] Field of Search ............... 428/503, 531, 345, 349, 428/913, 914, 409, 315, 526; 427/35–41, 44, 54.1, 55, 140, 148; 204/16, 158 HE, 159.11, 159.15, 181 E

[56] References Cited

U.S. PATENT DOCUMENTS

| | | | |
|---|---|---|---|
| 2,769,742 | 11/1956 | Helbing | 428/526 X |
| 3,188,266 | 6/1965 | Charbonneau et al. | 428/345 |
| 3,294,622 | 12/1966 | Wark | 428/531 |
| 3,309,221 | 3/1967 | Smith | 428/345 |
| 3,389,011 | 6/1968 | Svensson | 428/913 X |
| 3,445,327 | 5/1969 | Fuerst | 428/531 X |
| 3,899,611 | 8/1975 | Hall | 204/159.15 X |
| 3,935,330 | 1/1976 | Smith et al. | 427/54 X |
| 3,959,521 | 5/1976 | Suetsugi et al. | 428/424 X |
| 4,009,364 | 2/1977 | Ladstadter | 427/55 X |
| 4,022,926 | 5/1977 | Keough et al. | 428/354 X |
| 4,035,274 | 7/1977 | McGinniss | 204/181 E |
| 4,170,664 | 10/1979 | Spenadel et al. | 427/44 |
| 4,179,529 | 12/1979 | Vetter | 427/44 |

*Primary Examiner*—Harold Ansher
*Attorney, Agent, or Firm*—Dressler, Goldsmith, Shore, Sutker & Milnamow

[57] ABSTRACT

Described herein is a resin-cured carrier material and a process for preparing a resin-cured carrier material. The carrier material has two oppositely disposed major surfaces and a core therebetween, the core being impregnated with at least one heat-cured thermosetting resin and at least one of the two surfaces having a coating of at least one polymerization resin curable by U.V.-radiation, electron radiation or the radiation of radioactive isotopes.

12 Claims, No Drawings

CARRIER MATERIALS IMPREGNATED WITH THERMOSETTING RESINS, PROCESS FOR THEIR MANUFACTURE AND THEIR USE

The invention relates to carrier materials impregnated with thermosetting resins, for finishing the surfaces of materials sensitive to pressure and temperature, to a process for the manufacture of such carrier materials and to their use.

Carrier materials impregnated with thermosetting resins, for finishing the surfaces of materials sensitive to pressure and temperature, have already been disclosed, but these have the disadvantage that they require either the use of expensive radiation-curable polymerization resins in large quantities or require, when they are used, the action of a disadvantageously high temperature and pressure. Thus, radiation-curable polymerization resins are several times more expensive than heat-curable condensation resins which otherwise are also used for finishing surfaces. This debit on the costs is made yet more serious by the fact that precisely in the case of base materials which are sensitive to pressure and temperature and in most cases are thermoplastic, the surface finish layer which has to be applied must have considerable body, that is to say it must consist of a carrier material of relatively heavy weight, which can be thoroughly solidified, and this entails considerable expenditure in terms of quantity of thermosetting resin.

Admittedly, it is known from the state of the art to use heat-cured thermosetting resins on their own in carrier materials for finishing the surfaces of materials sensitive to pressure and temperature. When using these heat-curable resins, however, the heat-curing requires a disadvantageously high expense, even though the final product meets the requirements made with respect to the hardness and chemical resistance achieved.

Starting from the state of the art described above, it is the object of the invention to provide carrier materials impregnated with thermosetting resins for finishing the surfaces of materials sensitive to pressure and temperature.

It is a further object to provide a simple and economical process for the production of the said carrier materials impregnated with thermosetting resins, wherein products are obtained, the quality of which at least corresponds to the known products and which can be laminated without a significant action of temperature and pressure onto base materials sensitive to temperature and pressure and can be fully cured.

It is a further object of the invention to provide a process for the production of the said carrier materials impregnated with thermosetting resins, wherein the layer of radiation-curable resin is initially applied to an auxiliary substrate, the auxiliary substrate being removed after the carrier material impregnated with thermosetting resins has been combined with the precursor consisting of radiation-curable resin and auxiliary substrate and after an appropriate cure has been carried out.

Finally, it is a further object of the invention to repair defects in the surfaces, which have been finished by means of heat-cured resins, of wood materials by applying a layer of radiation-curable resins and by appropriate curing.

According to the invention, carrier materials are made available which, in their core, essentially comprise a heat-cured thermosetting resin and, on at least one of the two surfaces, coatings of radiation-curable polymerization resins.

It has been found that, with a view to the smallest possible penetration losses and to a good surface layer of radiation-curable coating, the period of time between the application of the radiation-curable coating and the first stage of the initial curing, by radiation treatment which follows should be as short as possible and should be less than 4 seconds in the case of carrier materials pre-impregnated with heat-curing resins.

Very good results are obtained when the period of time between the application and the first initial curing is about 1.5 seconds.

The carrier materials impregnated with thermosetting resins, according to the invention, are advantageously produced by fully impregnating the carrier materials with heat-curable resins, then fully curing these heat-curable resins by very extensive heat-curing to give a thermoset resin and then applying coatings of radiation-curable polymerization resins to at least one of the two surfaces and, if desired, applying an adhesive layer to one of the two surfaces of the carrier materials.

Preferably, the heat-curable resin used has such a B time that, during the subsequent drying treatment and heat treatment, it loses the B time, which was originally present, except for a remainder of a maximum of 20 seconds, preferably of less than 1.5 seconds, or in which the B time which was originally present is completely used up and exceeded by periods of time of the order of 10 seconds at a reference temperature of 140° C.

B time is to be understood as the time within which the resin passes from the liquid molten state (A state) into the rubber-like state (B state). The B time is determined in accordance with "Kunststoff-Praktikum", Gaetano D'Alelio, Carl Hanser-Verlag, Munich 1952, page 174, Test Procedure 4. In this procedure, 0.3 g of resin is placed at a defined temperature into a depression (2 cm diameter and 8 mm maximum depth) in a steel plate and is stirred with a glass rod having a drawn-out tip. In this test, the initially mobile resin gradually passes into a more viscous and finally rubber-like state. The B state is reached when the resin filaments which form on pulling the rod up, tear off like rubber.

The B time of the resin present in the carrier material cannot directly be determined experimentally; however, starting from the B time characteristics of the initial state before the subsequent drying treatment and heat treatment and starting from the *dwell times*, which can be found from the process conditions, in the stages of temperature action applied, the B time can be determined. Such a determination is based on a calculated weighting of the temperature action with respect to its influence on the state of curing as a function of the particular experimentally found B time characteristic of the resin employed, which is catalyzed by the carrier material.

Using a pocket calculator, a technician can simply carry out such a determination in practice.

The formula to be used is:

$$K_i = 1 - \sum_i^I \frac{V_n}{B_n};$$

wherein
$K_i$ represents the proportionate B time available, relative to the original state before heat treatment, in the substrate impregnated with heat-curing synthetic resins after the stages 1 to i of temperature action, after the heat treatment inherent in the preparation within the scope of the impregnation. $V_n$ is the dwell time in the temperature stage n of the heat treatment inherent in the preparation;

$B_n$ is the experimentally determined B time of the resin under consideration in the temperature stage n and *before any temperature action,* but taking into account a catalyzing action, which may be present, of the carrier material.

In the case of a one-stage temperature action at 140° C. which, for example, applies in a laboratory impregnating machine and which prevails in the drying tunnel over a length of 1.2 m, the following dwell times result at the following web speeds:

| | |
|---|---|
| 0.6 m/minute | 2 minutes = 120 seconds |
| 0.5 m/minute | 2.4 minutes = 144 seconds |
| 0.4 m/minute | 3 minutes = 180 seconds |
| 0.3 m/minute | 4 minutes = 240 seconds |

In the case of a B time given at 140° C. of the catalyzed resin of 170 seconds in the final impregnated paper (=in the pre-impregnated substrate before the radiation-curable coating is applied), these dwell times give K values=proportionate available B times, relative to the initial B time and absolute B times, as follows:

thermore, impregnating resin compositions which are mentioned in BASF leaflets M 2203d or M 5209d, or also other inexpensive aminoplast resins or phenoplast resins, falling into the group of condensation resins, can be used. The printed publications quoted above are fully incorporated herein by reference.

According to a preferred embodiment, the mixtures used for fully impregnating the carrier materials contain flame-retarding additives which are customary per se. Appropriate flame-retarding additives are described, for example, in German Offenlegungsschriften Nos. 2,315,416 and 2,808,453. A flame-proof finish of this type is of considerable importance, in particular when the carrier materials, according to the invention, impregnated with thermosetting resins are applied to readily inflammable base materials, for example foam base materials.

For coating the inner and outer surfaces of the carrier materials impregnated with thermosetting resins, it is possible to use most of the compounds which are capable of polymerization or copolymerization and which can be cured by the action of radiation. Curing by means of UV radiation has proved to be particularly suitable. Coating resins which can be cured by UV radiation are, inter alia, mentioned in the following printed publications: German Pat. Nos. 1,694,349, 1,694,253 and 1,902,930, German Auslegeschriften 2,251,469, 2,244,171, 1,769,853, 2,426,602 and 2,426,603

| Web Speed | Dwell Time | K Value $(1 - \frac{V}{E})$ | Available B time K × B |
|---|---|---|---|
| 0.6 m/minute | 2 minutes = 120 seconds | $1 - \frac{120}{170} = 0.295$ | 0.295 × 170 = 50.2 seconds |
| 0.5 m/minute | 2.4 minutes = 144 seconds | $1 - \frac{144}{170} = 0.153$ | 0.153 × 170 = 26 seconds |
| 0.4 m/minute | 3 minutes = 180 seconds | $1 - \frac{180}{170} = -0.059$ | −0.059 × 170 = −10 seconds |
| 0.3 m/minute | 4 minutes = 240 seconds | $1 - \frac{240}{170} = -0.412$ | −0.412 × 170 = −70 seconds |

When using the carrier materials impregnated with thermosetting resins, according to the invention, for finishing the surfaces of materials sensitive to pressure and temperature, at least one outside is provided with an adhesive layer consisting of heat-curable and/or radiation-curable resins, and this has the consequence that the base material to be coated is not to be exposed to any significant action of pressure and temperature.

Thus, according to the invention, a carrier web is first fully impregnated with an inexpensive heat-curable condensation resin which immediately thereafter cures under the action of temperature and forms a framework which is free from further phase separations caused by curing and solidifies and the cavities and pores of which are subsequently filled with radiation-curable polymerization resins, whereupon finally at least one of the surfaces is also provided with a layer which at the same time acts as a protective layer. This layer can contain heat-curable and/or radiation-curable resins.

The heat-curable condensation resins which accordingly are present as thermoset resins in the final crosslinked state and which are used for fully impregnating the carrier materials, can in principle be almost any resins employed according to the state of the art for finishing the surfaces of chipboard and the like, which are described, for example, as an impregnating resin in German Auslegeschrift No. 1,932,528, in German Pat. No. 1,696,261 or in German Pat. No. 1,469,570. Furand German Offenlegungsschriften Nos. 2,616,408, 2,706,549, 2,706,575, 2,706,638, 2,706,639, 2,703,863, 2,705,612, 2,617,827 and 2,617,828.

The following may be mentioned as coating resins which are particularly suitable for purposes of the invention and which can be cured by UV radiation:

Resins according to German Auslegeschrift No. 2,251,469, wherein 100 parts of a polyester obtained from 2,550 parts of fumaric acid, 459 parts of propylene glycol, 1,470 parts of diethylene glycol, 989 parts of trimethylolpropane diallyl ether, 463 parts of diethylene glycol monobutyl ether and 0.34 part of hydroquinone are mixed with 50 parts of N-methylolacrylamide allyl ether and 3.75 parts of p-benzoylbenzal chloride are added to the mixture.

A coating resin to be cured by UV radiation is built up by reacting or combining the following component substances:

(1) Polymers or oligomers which determine the fundamental character of the coating resin, (2) multifunctional monomers, in the main for establishing the degree of crosslinking, (3) if desired, monofunctional monomers, as "reactive diluents", (4) photoinitiators, if desired together with accelerators, (5) if desired, pigments or fillers which, as far as possible, should not have any significant UV absorption, and (6) if desired, auxiliaries for influencing the photochemical reaction or the technological properties of the resin employed, for example wetting agents.

In curing by UV radiation, the crosslinking reaction to form thermoset resins is triggered by a photoinitiator, the mode of action of which can largely be explained by reference to aspects of quantum chemistry. Photoinitiators of great importance, which in most cases are added in quantities of the order of about 1% or less, are above all aromatic ketones and benzoin alkyl ethers, and $\alpha$-alkylated derivatives thereof.

Possible polymers or oligomers which can particularly preferably be used according to the invention are: unsaturated polyesters which are built up as condensation products from $\alpha,\beta$-ethylenically unsaturated dicarboxylic acids, such as maleic acid, fumaric acid and itaconic acid, and monofunctional and/or bifunctional hydroxy compounds which contain one or more $\beta,\gamma$-ethylenically unsaturated ether groupings in the molecule.

Preferred monomers used are acrylate esters of alcohols of different functionality, pentaerythritol triacrylate or trimethylolpropane triacrylate being employed preferentially.

In the preparation of the carrier material according to the invention, it is also possible to employ coating resins which can be cured by electron radiation and which represent mixtures of crosslinkable polymers, that is to say oligomers or prepolymers, which determine the actual film characteristics and which in turn can be caused in an advantageous manner to undergo a crosslinking reaction with, for example, compounds having terminal acrylate groups, such as acrylic acid-modified polyether resins, acrylic ester-terminated polyurethane resins or acrylic acid-modified epoxide resins.

Coating resins which can be cured by electron radiation are mentioned, for example, in the printed publications quoted as follows: German Pat. Nos. 1,694,177, 2,063,134 and 2,063,135, German Auslegeschriften Nos. 2,049,714, 2,049,715 and 2,064,701 and German Offenlegungsschrift No. 2,704,969.

The monomers preferably used here are also those of the acrylate ester type. In addition, however, the following are also particularly suitable: divinylbenzene and also five-membered to seven-membered heterocyclic N-vinylamides, in particular N-vinylpyrrolidone-2.

Since the frequency of the formation of free radicals does not depend on the temperature and, as a rule, only a low activation energy is required for the progress of the polymerization, coating resins which can be cured by electron radiation give high polymerization rates at a relatively low temperature.

Even though the radiation-curable polymerization resins mentioned above as being preferred are merely those which are cured by means of UV radiation or electron radiation, this does not in any way mean a restriction to this particular type of radiation-curable resins. Rather, any desired polymerization resins, for which suitable radiation other than UV radiation or electron radiation can be used for curing, can of course be employed, e.g., radiation of radio-active isotopes.

Possible irradiation devices for UV-curable coating resins are radiation sources which emit ultra-violet light, preferably mercury lamps. The wavelength range selected for curing is preferably between about 300 and 400 nm. The radiation sources are rod-type lamps which are provided with reflectors in order to obtain better utilization of the radiation flux emitted. In principle, two basic types of mercury lamps can be used. These are a low-pressure radiator with radiator temperatures from 35° to 40° C., a power absorption from 40 to 150 Watt and an intensity of irradiation of about 0.2 W/cm$^2$ and a high-pressure radiator with radiator temperatures from 600° to 700° C., a power absorption from 1 to 5 kW and an intensity of irradiation of 3 W/cm$^2$.

As a rule, the distance between the coating resin to be cured and the radiator is only a few centimeters. In order to eliminate heating, which is most cases is undesirable, by simultaneously emitted infra-red radiation, a heat radiation filter or cooling is necessary in the case of the high-pressure lamps which are characterized by a higher power. When the coated carrier material is passed through on a belt below the radiation unit consisting of several tubes, it is also possible to effect precuring using low-pressure radiators coupled with subsequent full curing using high-pressure radiators, a possible variant being pulsed radiation operation of the high-pressure radiators by means of UV radiation flashes (about 1 millisecond) with relatively long pauses in the flash sequence, the energy transfer being of the same magnitude as in continuous operation.

Electron radiation curing units are in general high-vacuum units in which the beam is brought to the requisite velocity and hence penetrating power by means of suitable electrodes and in which it obtains its bundled shape. The beam leaves the high-vacuum vessel through a window which consists of a titanium foil of about 25 $\mu$m thickness and which serves as the high-vacuum seal. Accelerating voltages between 100 and 500 kV and power absorptions between 10 and 100 kW can be regarded as typical operating data for units of this type. Dosages of 10 to 100 Joule/g are necessary for fully curing the resin.

The drying treatment and heat treatment, which precede the treatment of the abovementioned coating resins, of the carrier material which is still predominantly impregnated with condensation resins are advantageously effected in impregnation units, it being possible to use four to five controllable areas for the contactless treatment of carrier materials.

According to the invention, it can now be an advantage in the impregnation of the core of the carrier materials employed, when not only a resin which can be cured to give a thermoset resin but simultaneously a radiation-curable polymerization resin admixed with the former are employed. However, the radiation-curable polymerization resin intended for coating the inner and outer surfaces of the carrier materials can also contain proportions of heat-curable resins which are transformed into a thermoset resin in the course of a crosslinking reaction.

It must be regarded as surprising that the cavities and pores, formed by the action of heat without pressure in the impregnating machine employed in the preparation of the carrier material, according to the invention, impregnated with thermosetting resins, of the framework of fully cured condensation resin can be filled with radiation-curable resins to such an extent that, after the subsequent curing under the action of radiation, no differences can be found in the application properties as compared with those carrier materials which are impregnated with condensation resins heat-curing under the action of pressure and temperature and are conventionally pressed under the action of pressure and temperature. It is obviously a contributory factor that the coating with radiation-curable resins also results in additional sealing and filling of residual pores, close to the rim, of the carrier web which has been cured almost without pressure with heat-curable condensation resins. Surprisingly, auxiliary measures in the form of additionally squeezing radiation-curable polymerization resin into the pores and cavities of the framework of cured condensation resin can be dispensed with in the case of most of the carrier webs and carrier materials.

According to a preferred embodiment, curing of the radiation-curable resins is effected by multi-stage irradiation. This stage-wise irradiation makes it possible to match the intensity of radiation and the type of radiation to the various polymerization resins used in the particular case and also partially to anticipate the radiation-curing effect in a manner appropriate to the production installation of the board finisher (processor of the carrier material) and to the handling characteristics of the carrier material, within the scope of the resin treatment which takes place solely on the carrier material.

In the case of relatively thick layers of radiation-curable resins, a stage-wise irradiation facilitates more uniform curing down to the deeper layers since different wavelengths can be used coupled with controlled after-curing of the outer layers.

This is an advantage for the use of the product according to the invention in the so-called "post-forming process", such as is described, for example, in the handbook "Verbund von Holzwerkstoff und Kunststoff in der Möbelindustrie [Bonding of Wood Material and Plastic in the Furniture Industry]" VDI-Verlag, Düsseldorf, 1977, ISBN 3-18-404028-3, on page 107 et seq.

Stage-wise irradiation is also important for the initial crosslinking of adhesives employed when products according to the invention are laminated on, in order to obtain better bonds.

The use, according to the invention, of mixtures of heat-curable condensation resins and radiation-curable polymerization resins for the impregnation of the carrier web has the purpose of introducing a radiation-curable resin, which remains flowable until the later radiation treatment, into the pores and cavities of the framework of condensation resin which cures by drying treatment and heat treatment.

Certain proportions of heat-curing polymerization resins, which cure without phase separation, in radiation-curable polymerization resins of the outer coating, or certain proportions of heat-curable condensation resins or polymerization resins in the radiation-curable resins of the inner adhesive coating, as already mentioned above, are appropriate or advantageous in some cases with a view to the control of the curing proportions of heat-curing and radiation-curing and to the improvement of the bond.

In principle, curing by the action of heat and the action of radiation on the carrier material which has been impregnated with thermosetting resins and coated is taken to such a stage that there is only a minimum of remaining action of radiation for producing the bond and the residual curing on the sensitive base material which is to be finished. This aim is limited in practice by the requirements for the handling, flexibility and shaping of the carrier material, impregnated with thermosetting resins, according to the invention.

Sometimes it can be advantageous to protect the outer radiation-curable coating, consisting of a polymerization resin, by an air-tight paraffin covering layer. In an advantageous embodiment of the invention, the outer coating curable by electron radiation is covered with the aid of a thermoplastic protective film which does not prevent curing by radiation. It is also possible to remove, that is to say to peel off, the protective film from the outer coating only at the stage of the finished completed product after the curing by radiation has been carried out.

A particular advantage of the invention is the fact that carrier materials impregnated with thermosetting resins and coated obtain surface coatings of excellent quality under a minimum action of pressure, at room temperature and with single-stage or multi-stage radiation curing as appropriate; otherwise, according to the state of the art, such a quality can be achieved only with known heat-cured coatings. The combination of a heat-cured condensation resin framework, which has been produced in the interior of the carrier material, with pores and cavities which are filled with radiation-curing resins is decisive for the technological success which can be achieved by the invention, the coating of the carrier materials thus pretreated with radiation-curable resins and the single-stage or multi-stage curing of the radiation-curable resin proportions being carried out in accordance with their composition and local distribution. Since it makes possible the combination of heat-curing and radiation-curing, the invention leads to coated carrier materials, impregnated with thermosetting resins, which do not pollute the environment, save energy and are of high quality and value, for use on materials which are sensitive to pressure and temperature. Preferably, the materials to be finished, which are sensitive to pressure and temperature, within the scope of the invention are to be understood as the following:

Board materials consisting of wood materials of inhomogeneous structure and with binders of low heat resistance, such as, for example, block boards, veneers, plywood and chip-board of low density, for example having densities below 500 kg/m³, sheets consisting of thermoplastic materials, foam sheets consisting of polyurethanes or thermoplastic materials and board materials consisting of fibrous or granular materials of very diverse type with binders of low heat resistance.

In a wider sense, these are also to be understood as laminated boards with metal foils in their structure; to avoid defects caused by differential thermal expansion, these can be produced more advantageously without the action of an elevated temperature.

The use of the carrier materials, impregnated with thermosetting resins, according to the invention can bring advantages even in the manufacture of "Coil-Coating" products.

The processing means which can be used for the carrier materials, impregnated with thermosetting resins, according to the invention are preferably simple cold-press units according to the state of the art, laminating rollers or also belt-type press units, having specific pressures of about 0.5 kp/cm² (=5 N/cm²), which are arranged in such a way that the arrangement and action of the irradiation units are impeded as little as possible, or which permit a stage-wise action of irradiation.

According to the invention, a process is also provided for repairing defects in surfaces which have been hot-pressed and finished with heat-cured resins, in particular in decorative surfaces of wood chipboard, wood fiberboard and laminated board.

In the past, numerous attempts have been made to repair heat-cured surfaces, in particular those on boards; hitherto, however, this could only be carried out using heat-curable resins or lacquers which cure incompletely, and hence only with an unsatisfactory result.

The completely satisfactory repair of board surfaces finished with heat-curable resins failed because the already cured resin in the immediate proximity of the defect was over-cured when the repair resin applied in the zones to be repaired was cured, and this led to over-cure cracks.

The repair or further lacquering of local defects had thus to be carried out with incompletely cured resins or lacquers, and in practical use the repaired areas were washed out again or wore off during the use of cleaning agents or under the action of correspondingly aggressive chemicals.

The invention teaches that, with the aid of radiation-curable resins based on acrylic resins or vinyl resins having terminal double bonds and in conjunction with electron beam irradiation or UV irradiation, it is possible to restore the full value of the finishing effect of thermosetting resins on repaired areas, without over-curing the protective resin layer already present.

This possibility of repairs of full value or almost full value has considerable economic importance since, as a rule, this eliminates time-consuming and expensive replacement production, provided only that radiation-curing units corresponding to the state of the art are available.

It was surprising that it was possible to avoid discolorations of the decorative surface by selecting papers which were suitably filled and pigmented and impregnated with light-stable heat-curable aminoplast resins, so that the hiding power, color and decorative effect of resin-impregnated substrates selected according to the invention were preserved unchanged in spite of the action of high-energy radiation.

It was also surprising that it proves possible, with and sometimes without the known additional measures for improving adhesion by producing polar groups, to achieve to an adequate extent a satisfactory bond of the radiation-curing repair resin layer or heat-cured surfaces and to preimpregnated substrates.

In critical cases, it is possible preventively to ensure this bonding action by admixing small amounts of radiation-curable resins into the heat-curable coating resins used.

Depending on the suitability, known radiation-curable aminoplast acrylates according to German Patent Specification No. 2,550,740, radiation-curable resins of the state of the art, based on polyester acrylates according to German Patent Specification No. 2,049,715, based on urethane acrylates according to German Patent Specification No. 2,636,425, or polyepoxide acrylates according to German Patent Specification No. 2,038,658 or other radiation-curable resins corresponding to the state of the art can be used for the repair.

A suitable layer thickness of radiation-curable resins for the repair was found to be between 2 $\mu$m and 20 $\mu$m, preferably 10 $\mu$m to 15 $\mu$m.

With respect to high-energy irradiation units, suitable for the repair, mercury vapor lamps, xenon lamps and tungsten lamps have proved suitable, and in particular mercury vapor discharge lamps of low, medium and high pressure, a wavelength range from 150 nm to 500 nm being preferably used.

For electron beam curing, units having accelerator voltages between 100 and 300 KeV have proved suitable, and the distance between the surface of the workpiece and the emission point of the radiation should be about 10 cm per 100 KeV.

Almost all the irradiation units of the state of the art can be used if the curing properties of the repair resins and the irradiation time to be applied are appropriately matched to the intensity of irradiation.

The examples which follow are now intended to illustrate the invention in yet more detail, but it must be pointed out that the carrier material always selected according to this example, namely paper, is not intended to represent a restriction since the invention is also applicable to fabric webs, nonwovens and the like and to metal and mineral materials.

EXAMPLE 1

A carrier web of paper of about 120 g/m$^2$ basic weight, having wet breaking length values from 700 to 900 meters, air permeability values of 100 ml (according to Schopper) and, on the outside coating, smoothness values according to Beck (see Handbuch der Werkstoffprüfung [Handbook of Materials Testing], Volume 4, Korn-Burgstaller, page 314, 2nd edition, Verlag Springer 1953) of about 20 seconds, is impregnated with a mixture of a commercially available aqueous solution of a urea/formaldehyde condensation product and a melamine/formaldehyde condensation product in 50:50 proportions by weight, in an impregnating machine of Vits IPA/K type and dried in a "Lay-on-Air" drying tunnel having 5 areas of 2 m length each with suitable temperature control and heat-treated in such a way that, before the subsequent coating, an intermediate product with an applied resin weight of 50 to 70% of the weight of the paper and less than 3% of volatile constituents and with curing which corresponds to exceeding the B time by 5 to 10 seconds at a reference temperature of 140° C., is obtained.

This intermediate product has a resin framework which is largely cured in the core of the carrier web.

Subsequently, it is coated on both sides with a viscous, radiation-curable solution in a layer thickness of 0.03 mm, this solution having been prepared in a known manner in accordance with German Auslegeschrift No. 2,049,715 in the following manner: 65 parts of a chlorine-containing unsaturated polyester which has been prepared from 1.2 moles of ethylene glycol, 1.2 moles of diethylene glycol, 1.47 moles of hexachloroendomethylene-tetrahydrophthalic acid and 1 mole of maleic anhydride at 160° to 170° C. and has an acid number of about 35, are comminuted and dissolved, with stirring and if necessary slight warming, in a mixture of 20 parts of N-vinyl-pyrrolidone-2, 15 parts of N-methylolacrylamide and 0.1 part of hydroquinone.

The period of time between the application of the radiation-curing coating composition and the beginning of the first action of radiation is restricted to a period shorter than 4 seconds.

The intermediate product coated with the solution described above now represents, without a significant further after-treatment, the carrier material impregnated with thermosetting resins, according to the invention, with which outer covering layers and bonds of excellent quality are obtained by electron irradiation with about 300 KeV at a current strength of 25 mA and a belt speed of about 40 m/minute; qualitatively, these are in no way inferior to a surface coated normally by pressing heat-cured condensation resins onto wood chipboard and curing.

EXAMPLE 2

A carrier web of the same characteristics as in Example 1 is processed in the manner described in Example 1 to give an intermediate product having a resin framework which is largely cured in its core.

This intermediate product is coated on each of the two sides with an applied quantity of 25 g/m$^2$ of the resin composition prepared as follows in accordance with German Auslegeschrift No. 2,251,469:

100 parts of a polyester, obtained from 2,550 parts of fumaric acid, 459 parts of propylene glycol, 1,470 parts of diethylene glycol, 989 parts of trimethylolpropane diallyl ether, 463 parts of diethylene glycol monobutyl ether and 0.34 part of hydroquinone, are mixed with 50 parts of N-methylolacrylamide allyl ether and 3.75 parts of p-benzoylbenzal chloride are added to the mixture, a resin composition mixture having a viscosity of about 25 Poises being obtained.

The intermediate product coated with the solution described above now represents, without a significant further after-treatment, a carrier material impregnated with thermosetting resins, according to the invention.

When this is passed through below four UV mercury high-pressure radiators (25 cm distance from the radiators) at a spacing of 5 cm with a passage time of 8 seconds of actual irradiation, hard outer coatings of high gloss and of very good quality result.

EXAMPLE 3

Before the impregnated and coated carrier web according to Example 2 is bonded to the material which is to be finished and is sensitive to pressure and temperature, its adhesive side is pre-cured by UV low-pressure irradiation at about 80 Watt, which is carried out, for example, in a unit provided for paper-coating using UV radiators.

The bond to the material to be finished and the final curing of the outer coating are effected in a second irradiation stage by passing through below four UV mercury high-pressure radiators (25 cm distance from the radiators) at a spacing of the radiators of 5 cm and at a speed of about 10 meters/minute.

Without a significant action of pressure and temperature, coatings of very high quality are now obtained, such as can otherwise be obtained only with heat-cured condensation resins under the action of curing temperatures of about 140° C.

EXAMPLE 4

In the production of the carrier material impregnated with thermosetting resins, according to the invention, as described in Example 1, a proportion of 15% of radiation-curable coating resin from Example 1 is added in the preparation of the intermediate product to the heat-curable impregnating mixture from Example 1. The intermediate product formed after the impregnation treatment, drying treatment and heat treatment, which have been described, contains, especially in the zones close to the outside, proportions of resins which have not yet fully cured and are radiation-curable and which reinforce the surface layer and hence the protective and adhesive effects of the outer coating and the adhesive coating.

In the carrier material impregnated with thermosetting resins, which has been prepared with this alteration but otherwise in accordance with Example 1, an improvement in the thickness and quality of the cured outer coating and in the bond to the material to be finished can be seen after the electron irradiation of the type described in Example 1.

EXAMPLE 5

The intermediate product from Example 2 is coated in such a way that an addition of 15% of the heat-curing impregnating resin mixture described in Example 1 is admixed to the adhesive coating of Example 2 and an addition of 5% of the heat-curing impregnating mixture described in Example 1 is admixed to the outer coating.

Without impairing the surface-finishing effect, these two additions have the effect of utilizing to a certain extent the heating, which occurs with mercury high-pressure radiators, by the simultaneously emitted infrared radiation and they reduce the necessity for measures to filter out the heat radiation or to cool.

When processing this carrier material impregnated with thermosetting resins in the manner described in Examples 2 and 3, surface coatings of very good quality without any impairment can be seen.

EXAMPLE 6

Intermediate products from Examples 1, 2 or 4 are coated on the inside (adhesive side) in the manner described in Example 1 with the electron radiation-curable coating resin composition from Example 1 and are coated on the outside with the UV radiation-curable coating resin composition from Example 2.

When processing the carrier material impregnated with thermosetting resins, according to the invention, which has been prepared in this way, the bond to the material to be finished is effected by irradiating the inner adhesive coating with electrons which have better penetration into the surface and in depth, and curing of the outer layer is achieved without problems by UV radiation. In this case, the electron irradiation can also be combined with a belt-type pressure element.

EXAMPLE 7

A decorative surface of a chipboard, prepared by hot-pressing in the so-called short-cycle process without re-cooling from melamine resin-impregnated decorative films of a raw paper weight of 80 g/m$^2$ and with about 150% of resin applied, which surface has a gloss which does not correspond to the requirements of the customer and is unsatisfactory and inhomogeneous, is coated on the surface, which is the subject of the complaint, using a suitable doctor blade device, with an applied amount of 15 g/m$^2$ (about 12 μm thickness) of the resin composition prepared as follows in accordance with German Auslegeschrift No. 2,251,469:

100 parts of a polyester, obtained from 2,550 parts of fumaric acid, 459 parts of propylene glycol, 1,470 parts of diethylene glycol, 989 parts of trimethylolpropane diallyl ether, 463 parts of diethylene glycol monobutyl ether and 0.34 parts of hydroquinone, are mixed with 50 parts of N-methylolacrylamide allyl ether and 3.75 parts of p-benzoylbenzal chloride are added to the mixture, a resin composition mixture being obtained, which has a viscosity of about 25 Poises. This resin composition corresponds to the composition indicated in Example 2.

After passing through below four mercury high-pressure radiators (25 cm distance from the radiators) at a spacing of 5 cm and at a passing-through speed of 10 m/minute (dwell time 6 seconds), the board surface treated in this way gives a hard outer coating of high gloss and excellent quality.

EXAMPLE 8

A decorative surface of a chipboard, prepared by hot-pressing in the so-called short-cycle process without re-cooling from melamine resin-impregnated decorative films of a raw paper weight of 80 g/m² and with about 150% of resin applied, which surface has a gloss which does not correspond to the requirements of the customer and is unsatisfactory and inhomogeneous, is coated on the surface, which is the subject of the complaint, using a suitable doctor blade device, with an applied amount of 15 g/m² (about 12 μm layer thickness) of the resin composition prepared as follows in accordance with German Auslegeschrift No. 2,049,715:

65 parts of a chlorine-containing unsaturated polyester which has been prepared from 1.2. moles of ethylene glycol, 1.2 moles of diethylene glycol, 1.47 moles of hexachloroendomethylene-tetrahydrophthalic acid and 1 mole of maleic anhydride at 160° to 170° C. and has an acid number of about 35, are comminuted and dissolved, with stirring and if necessary slight warming, in a mixture of 20 parts of N-vinyl-pyrrolidone-2, 15 parts of N-methylolacrylamide and 0.1 part of hydroquinone. This resin composition corresponds to the composition of Example 1.

The board surface treated in this way is cured to give an outer coating of high gloss and excellent quality by electron irradiation at about 200 KeV accelerator voltage, at a current strength of 25 mA and at a belt speed of 60 m/minute.

Based on the statements in the above Examples 7 and 8, the technician dealing in practice with radiation-curable resins is able with the aid of simple experiments also to select other suitable resin compositions from the increasingly growing number of radiation-curable clear lacquers offered on the market.

Likewise, those skilled in the art are able, in the case of adhesion defects in the repair coating, to apply the measures, known to the state of the art, for promoting adhesion, which measures range from simple mechanical roughening to polarized radicals formed by the action of oxidizing acids or by a corona discharge.

1. Carrier materials having two oppositely disposed major surfaces and a core therebetween tand impregnated with thermosetting resins for finishing the surfaces of materials sensitive to pressure and temperature, said carrier materials being fully impregnated in their cores, with at least one heat-cured thermosetting resin which is substantially cured to produce a resin framework containing pores and cavities and, on at least one of the two surfaces, a coating of at least one polymerization resin curable by U.V. radiation, electron radiation or the radiation of raido-cured isotopes, the pores and cavities of said resin framework being filled with said last-named coating resin.

2. Carrier materials impregnated with thermosetting resins, as claimed in claim 1, wherein said core resin contains at least one polymerization resin curable by U.V.-radiation, electron radiation or the radiation of radio-active isotopes and the coating resin contains at least one heat-curable resin.

3. Carrier materials impregnated with thermosetting resins, as claimed in claim 1 or 2, wherein an adhesive layer has been applied to one of said surfaces, said adhesive layer comprising a resin of the class consisting of heat-curable resins and resins curable by U.V.-radiation, electron radiation or the radiation of radio-active isotopes.

4. Carrier materials impregnated with thermosetting resins, as claimed in claim 1, 2 or 3, wherein said heat-cured thermosetting resin is selected from the group consisting of aminoplast and phenoplast resins.

5. Process for the production of carrier materials, impregnated with thermosetting resins for finishing the surfaces of materials sensitive to pressure and temperature, which comprises fully impregnated with at least one heat-curable resin a carrier material having two oppositely disposed major surfaces, then curing the heat-curable resins by extensive heat-curing to produce a thermoset resin framework containing pores and cavities and applying to at least one of the two surfaces at least one coating of at least one polymerization resin curable by U.V.-radiation, electron radiation or the radiation of radio-active isotopes filling the pores and cavities of said thermoset resin framework with said last-named coating resin, and thereafter curing said last-named coating resin by a radiation treatment of the group consisting of treatment with U.V.-radiation, electron radiation and the radiation of a radio-active isotope.

6. Process as claimed in claim 5, wherein the application of the coating is followed by at least one stage of radiation treatment, and wherein between 0.5 and 4 seconds elapses between said application and said treatment, said radiation treatment comprising treatment with U.V.-radiation, electron radiation, or the radiation of a radio-active isotope.

7. Process as claimed in claim 5, wherein the impregnating resin used has a content of at least one polymerization resin curable by U.V.-radiation, electron radiation or the radiation of radio-active isotopes and the coating polymerization resin has a content of at least one heat-curable resin.

8. Process as claimed in claim 5, wherein said heat-cured thermosetting resin is selected from the group consisting of aminoplast and phenoplast resins.

9. Process as claimed in claim 5, wherein the resin used for impregnating before coating is a heat-curable resin which, after the drying treatment and heat treatment inherent in the preparation, gives a residual B time of less than 20 second.

10. Process as claimed in claim 9, wherein said residual B time is less than 1.5 seconds.

11. Process for the production of carrier materials, having two oppositely disposed major surfaces and impregnated with thermosetting resins, for finishing the surfaces of materials sensitive to pressure and temperature by adhesion of one of said surfaces to a surface of said sensitive material, which comprises placing an auxiliary substrate which is coated on one side with a polymerization resin curable by U.V.-radiation, electron radiation or the radiation of radioactive isotopes and is permeable to the curing radiation, onto c..rrier materials impregnated with substantially cured thermosetting resins, in such a way that the layer of coating resin lies on that side of the carrier material, impregnated with thermosetting resins, which is opposite the surface intended to adhere to said sensitive material, fully curing the laminated product thus obtained and removing the auxiliary substrate.

12. Process for repairing defects in the surfaces of wood materials which have been finished by means of heat-cured resins, which comprises applying to said surfaces at least one resin curable by U.V.-radiation, electron radiation or the radiation of radio-active isotopes and subsequently curing said last named resin by means of radiation, the hardness, gloss, abrasion resistance and chemical resistance of said surfaces being largely achieved by the resin which has been applied thereto afterwards, solely as the result of th action of said radiation cure.

* * * * *

UNITED STATES PATENT OFFICE
CERTIFICATE OF CORRECTION

Patent No. 4,246,315    Dated January 20, 1981

Inventor(s) Otto Kopp, Helmut Holzer, Charlotte Birnbaum

It is certified that error appears in the above-identified patent and that said Letters Patent are hereby corrected as shown below:

Col. 3, line 30, in the heading of the third column of Table K Value "$1\frac{V}{E}$" should be --$1\frac{V}{B}$--.

Col. 13, line 46, "tand" should be --and--.

Col. 13, line 55, "raido-cured" should be --radio-active--.

Col. 16, line 2, "th" should be --the--.

Signed and Sealed this

Ninth Day of June 1981

[SEAL]

Attest:

RENE D. TEGTMEYER

*Attesting Officer*    *Acting Commissioner of Patents and Trademarks*